US008931645B2

(12) United States Patent
Kim et al.

(10) Patent No.: US 8,931,645 B2
(45) Date of Patent: Jan. 13, 2015

(54) CENTRIFUGAL FILTER

(75) Inventors: Yong-Keun Kim, Ulsan (KR); Kun-Soo Kong, Busan (KR); Deog-Hee Doh, Busan (KR)

(73) Assignee: Shin Heung Precision Co., Ltd., Ulsan (KR)

( * ) Notice: Subject to any disclaimer, the term of this patent is extended or adjusted under 35 U.S.C. 154(b) by 180 days.

(21) Appl. No.: 13/500,713

(22) PCT Filed: Jul. 30, 2010

(86) PCT No.: PCT/KR2010/005012
§ 371 (c)(1),
(2), (4) Date: Apr. 6, 2012

(87) PCT Pub. No.: WO2012/015086
PCT Pub. Date: Feb. 2, 2012

(65) Prior Publication Data
US 2013/0193058 A1 Aug. 1, 2013

(30) Foreign Application Priority Data
Jul. 27, 2010 (KR) ........................ 10-2010-0072497

(51) Int. Cl.

| | |
|---|---|
| ***B01D 33/06*** | (2006.01) |
| ***B04B 11/06*** | (2006.01) |
| ***B01D 33/00*** | (2006.01) |
| ***B04B 5/00*** | (2006.01) |
| *F01M 1/10* | (2006.01) |

(52) U.S. Cl.
CPC ............ *B01D 33/0087* (2013.01); *B04B 5/005* (2013.01); *B04B 11/06* (2013.01); *F01M 2001/1035* (2013.01)
USPC ........................................... 210/359; 210/377

(58) Field of Classification Search
CPC .... B01D 33/0087; B04B 5/005; B04B 11/06; F01M 2001/1035
USPC .................................................. 210/359, 377
See application file for complete search history.

(56) References Cited

U.S. PATENT DOCUMENTS 2,913,119 A * 11/1959 Huser .......................... 210/377
4,997,556 A 3/1991 Yano et al.
(Continued)

FOREIGN PATENT DOCUMENTS

JP 08-177447 7/1996
KR 10-0213155 5/1999
(Continued)

OTHER PUBLICATIONS

International Search Report—PCT/KR2010/005012 dated Aug. 30, 2011.

*Primary Examiner* — Fred Prince
(74) *Attorney, Agent, or Firm* — Rabin & Berdo, P.C.

(57) ABSTRACT

Disclosed herein is a centrifugal filter. The centrifugal filter includes a shaft, a rotor housing which rotates around the shaft and has filter paper on the inner side surface thereof, a spindle tube which rotates along with the rotor housing around the shaft and discharges the fluid from the shaft into the rotor housing, and a separation film which separates an internal space of the rotor housing into upper and lower portions so that impurities that are removed from the fluid by means of centrifugal force are deposited in the upper portion of the internal space while filtered fluid flows into the lower portion of the internal space. A dispersing means is provided on the spindle tube to make a cross-sectional shape of the fluid discharged from the spindle tube into the rotor housing be an elongated shape so that the fluid is widely dispersed into the rotor housing.

26 Claims, 12 Drawing Sheets

(56) References Cited

U.S. PATENT DOCUMENTS

| | | | |
|---|---|---|---|
| 5,779,618 | A | 7/1998 | Onodera et al. |
| 6,017,300 | A | 1/2000 | Herman |
| 7,713,185 | B2 | 5/2010 | Baumann et al. |

FOREIGN PATENT DOCUMENTS

| | | |
|---|---|---|
| KR | 10-2003-0031215 | 4/2003 |
| KR | 10-2007-0043695 | 4/2007 |

* cited by examiner

PRIOR ART

CENTRIFUGAL FILTER

Technical Field

The present invention relates, in general, to centrifugal filters and, more particularly, to a centrifugal filter in which the structure of a discharge hole formed in a spindle tube disposed in the central portion of the centrifugal filter is improved so that fluid that is discharged from the spindle tube into a rotor housing can be satisfactorily dispersed and thus uniformly applied to a comparatively large area of filter paper that is provided on the inner surface of the sidewall of the rotor housing, thus enhancing the efficiency of removing impurities from the fluid.

Background Art

Generally, a centrifugal filter is a filter which removes impurities from fluid using centrifugal force. Different kinds of centrifugal filters have been used.

The performance of filtering out impurities from fluid acts as a critical factor that determines the performance and lifetime of, for example, an engine or fluid machinery. In the case of the engine or fluid machinery, if impurities are not satisfactorily filtered out from the fluid, residual impurities cause damage to the engine or fluid machinery, leading to an enormous loss.

FIG. 1 is a sectional view of a conventional centrifugal filter.

The conventional centrifugal filter includes a shaft 10, a rotor housing 20, a spindle tube 30 and a separation film 40. The shaft 10 defines a passage therein through which fluid enters the filter. The rotor housing 20 rotates around the shaft 10 and generates centrifugal force. The rotor housing 20 includes filter paper 21 which is provided on the inner surface of the sidewall thereof and filters out impurities from the fluid. The spindle tube 30 rotates along with the rotor housing 20 around the shaft 10. The spindle tube 30 receives fluid from the shaft 10 and discharges the fluid into the rotor housing 120. The separation film 40 separates the internal space of the rotor housing 20 into upper and lower portions and into inner and outer portions so that impurities that are removed from the fluid by means of centrifugal force are deposited in the upper portion S1 of the internal space while the filtered fluid flows into the lower portion S2 and then is discharged through a nozzle 50 that is provided in a lower end of the rotor housing 20.

In the conventional centrifugal filter having the above-mentioned construction, fluid that is drawn into the filter through the shaft 10 is discharged into the rotor housing 20 through nozzle holes 31 which are formed in the spindle tube 30. Centrifugal force that is generated by the rotation of the rotor housing 20 removes impurities from the fluid in such a way that the impurities are deposited on the sidewall of the rotor housing 20 or the separation film 40. The filtered fluid is drawn into the lower portion S2 of the internal space of the rotor housing through the separation film 40 and then discharged out of the filter through the nozzle 50.

However, in the case of the conventional centrifugal filter, the nozzle holes that are formed in the spindle tube are simple holes which are formed merely by piercing the circumferential surface of the spindle tube. Therefore, fluid that is discharged through the nozzle holes cannot be sufficiently dispersed before reaching the filter paper provided on the sidewall of the rotor housing. That is, fluid is focused on specific portions of the filter paper, thus reducing the efficiency of removing impurities from the fluid, and easily damaging the filter paper.

DISCLOSURE

Technical Problem

Accordingly, the present invention has been made keeping in mind the above problems occurring in the prior art, and an object of the present invention is to provide a centrifugal filter which is configured such that fluid that is discharged from a spindle tube into a rotor housing can be sufficiently dispersed and applied to a comparatively large area of filter paper, thus enhancing the efficiency of removing impurities from the fluid.

Another object of the present invention is to provide a centrifugal filter which has a drain hole such that when the centrifugal filter stops, fluid that has remained in the rotor housing can be easily discharged out of the rotor housing through the drain hole.

Technical Solution

In order to accomplish the above objects, the present invention provides A centrifugal filter, including a shaft defining a passage therein through which fluid enters the centrifugal filter, a rotor housing rotating around the shaft and generating centrifugal force, with a filter paper provided on an inner surface of a sidewall of the rotor housing, a spindle tube rotating along with the rotor housing around the shaft, the spindle tube receiving fluid from the shaft and discharging the fluid into the rotor housing, and a separation film separating an internal space of the rotor housing into upper and lower portions and into inner and outer portions so that impurities that are removed from the fluid by means of centrifugal force are deposited in the upper portion of the internal space while filtered fluid flows into the lower portion of the internal space and is then discharged through a nozzle provided in a lower end of the rotor housing, wherein dispersing means is provided on the spindle tube to make a cross-sectional shape of the fluid discharged from the spindle tube into the rotor housing be an elongated shape so that the fluid is widely dispersed into the rotor housing.

The dispersing means may comprise a nozzle cap which is provided on the spindle tube and discharges fluid from the spindle tube into the rotor housing, wherein a plurality of discharge holes may be formed in a circumferential surface of the nozzle cap and each of the discharge holes may have an elongated shape so that the fluid discharged into the rotor housing is widely dispersed.

To more effectively disperse fluid, each discharge hole may be slanted in a direction opposite to a direction in which the rotor housing rotates, and an upper end of each discharge hole may be inclined upwards.

Further, each discharge hole may be elongated in the vertical direction. A plurality of protrusions may be provided on the inner surface of each discharge hole so as to scatter fluid.

The dispersing means may comprise a plurality of discharge holes formed in a circumferential surface of the spindle tube. Each of the discharge holes may have an elongated shape so that the fluid discharged from the spindle tube is dispersed.

To more effectively disperse fluid, each discharge hole may be slanted in a direction opposite to a direction in which the rotor housing rotates, and an upper end of each discharge hole may be inclined upwards.

Further, each discharge hole may be elongated in the vertical direction. A plurality of protrusions may be provided on the inner surface of each discharge hole so as to scatter fluid.

The dispersing means may comprise a plurality of discharge hole groups formed in a circumferential surface of the spindle tube. Each of the discharge hole groups may comprise a plurality of discharge holes arranged adjacent to each other in one direction selected from among vertical, horizontal and diagonal directions so that fluid is discharged from the discharge holes in an elongated cross-sectional shape.

Each of the discharge holes may be slanted in a direction opposite to a direction in which the spindle tube rotates.

The dispersing means may comprise a nozzle cap which is provided on the spindle tube and discharges fluid from the spindle tube into the rotor housing, wherein a plurality of discharge hole groups may be formed in a circumferential surface of the nozzle cap, and each of the discharge hole groups may comprise a plurality of discharge holes arranged adjacent to each other in one direction selected from among vertical, horizontal and diagonal directions so that the fluid is discharged from the discharge holes in an elongated cross-sectional shape.

Each of the discharge holes may be slanted in a direction opposite to a direction in which the spindle tube rotates.

Furthermore, a drain hole may be formed in the separation film so that when the centrifugal filter stops, fluid that has remained in the upper portion of the internal space is discharged into the lower portion of the internal space through the drain hole.

Furthermore, the separation film may be configured such that an upper end thereof is completely open so that filtered fluid overflows the upper end of the separation film and enters the lower portion of the internal space of the rotor housing.

In the present invention having the above-mentioned characteristics, fluid discharged into the rotor housing is applied to a larger area of the filter paper, compared to the case of the conventional centrifugal filter. Therefore, the present invention can enhance the efficiency of removing impurities from fluid.

Moreover, the present invention prevents fluid from being focused on specific portions of the filter paper and makes use of a larger area of the filter paper when filtering out impurities from the fluid. Thus, the present invention can not only enhance the efficiency of removing impurities from fluid but can also extend the lifetime of the filter paper.

Figure 1:
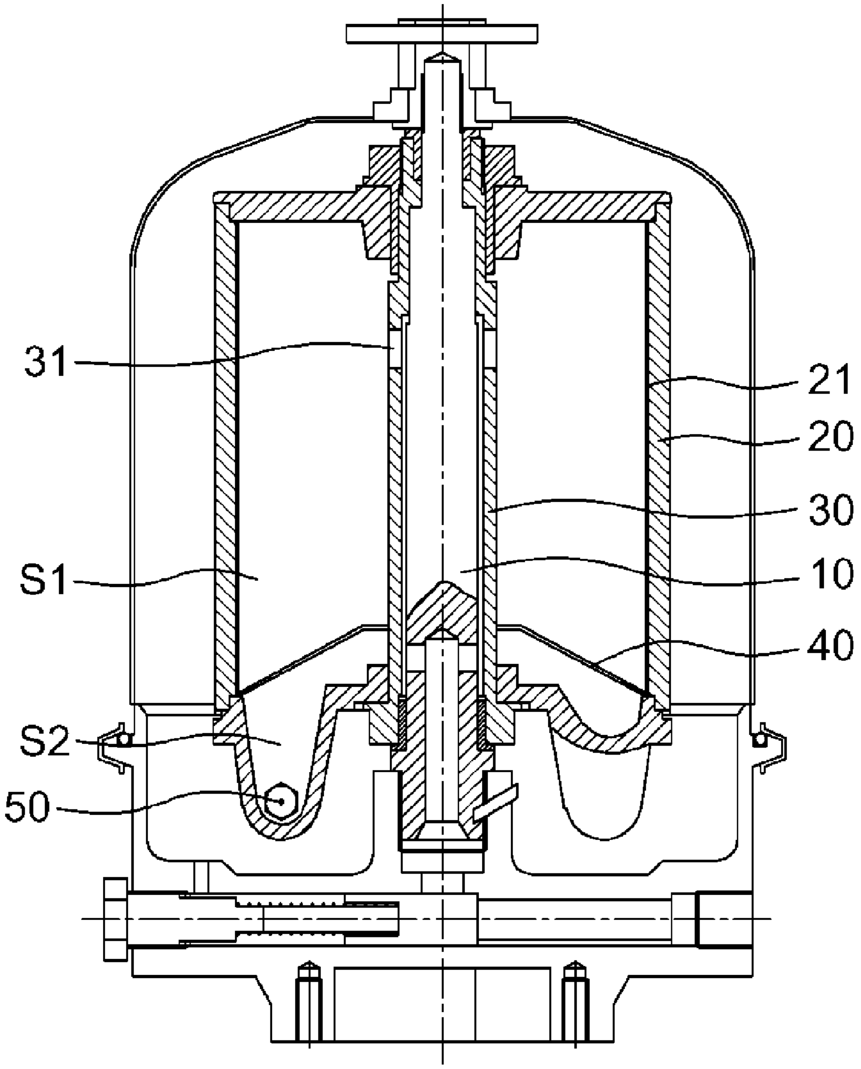
FIG. 1 is a sectional view of a conventional centrifugal filter.

| <Description of the Reference Numerals in the Drawings> | |
|---|---|
| (110): shaft | (120): rotor housing |
| (1221): filter paper | (130): spindle tube |
| (131): discharge hole | (1311): protrusion |
| (132): discharge hole | (133): discharge hole group |
| (140): separation film | (143): drain hole |
| (150): nozzle | (160): nozzle cap |
| (161): discharge hole | (1611): protrusion |
| (162): discharge hole | (163): discharge hole group |

BEST MODE

Hereinafter, a preferred embodiment of the present invention will be described in detail with reference to the attached drawings. If, in the specification, detailed descriptions of well-known functions or configurations would unnecessarily obfuscate the gist of the present invention, the detailed descriptions will be omitted.

Figure 2:
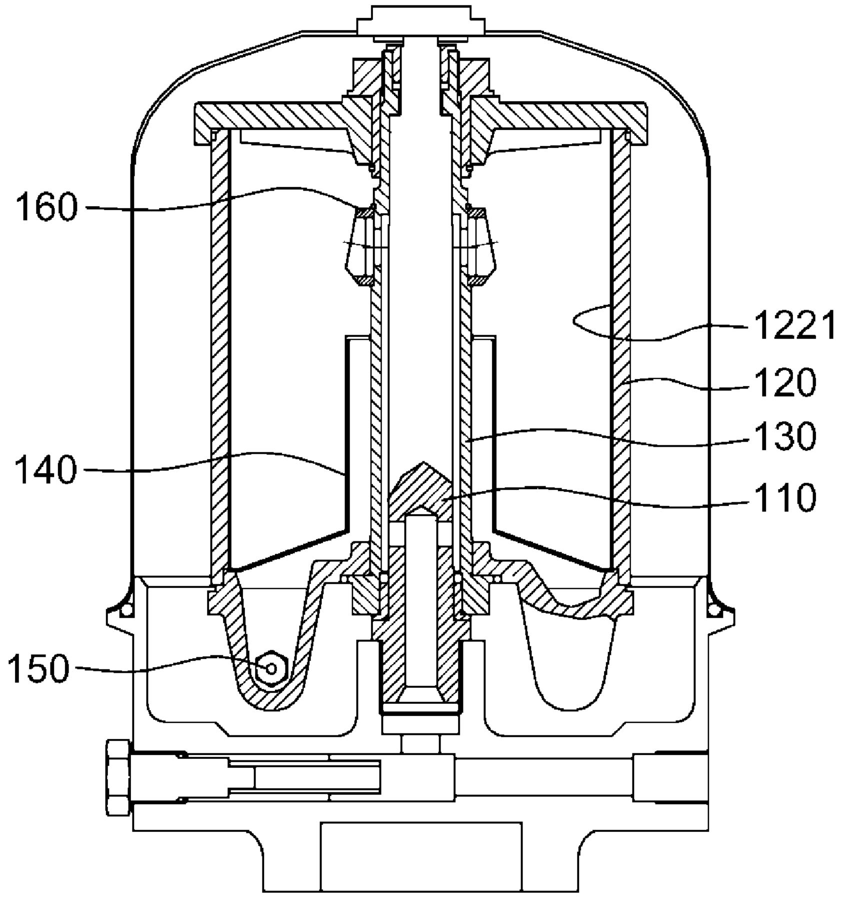
FIG. 2 is a sectional view illustrating a centrifugal filter according to a preferred embodiment of the present invention.

FIG. 2 is a sectional view illustrating a centrifugal filter according to a preferred embodiment of the present invention. The centrifugal filter of the present invention is based on the technology of the well-known centrifugal filter in which impurities are removed from fluid in such a way that a rotor housing 120 is rotated by reaction force generated when fluid drawn into the rotor housing 120 is discharged from a nozzle 150 after having been filtered. The centrifugal filter of the present invention is configured such that fluid discharged from a spindle tube 130 into the rotor housing 120 forms an elongated cross-sectional shape while being dispersed in the rotor housing 120, thus enhancing the efficiency of removing impurities from the fluid.

Typically, the well-known centrifugal filter includes a shaft 110, the rotor housing 120, the spindle tube 130 and a separation film 140. The shaft 110 defines a passage therein through which fluid enters the filter. The rotor housing 120 rotates around the shaft 110 and generates centrifugal force. The rotor housing 120 includes filter paper 1221 which is provided on the inner surface of the sidewall thereof and filters out impurities from the fluid. The spindle tube 130 rotates along with the rotor housing 120 around the shaft 110. The spindle tube 130 receives fluid from the shaft 110 and discharges the fluid into the rotor housing 120. The separation film 140 separates the internal space of the rotor housing 120 into upper and lower portions and into inner and outer portions so that impurities that are removed from the fluid by means of centrifugal force are deposited in the upper portion S1 of the internal space while the filtered fluid flows into the lower portion S2 and is then discharged through a nozzle 150 that is provided in a lower end of the rotor housing 120.

Based on the general construction of the well-known centrifugal filter, the centrifugal filter of the present invention further includes a dispersion means which is provided on the spindle tube 130 to make the cross-sectional shape of the fluid discharged from the spindle tube 130 into the rotor housing 120 be an elongated shape so that the fluid can be widely dispersed into the rotor housing 120.

Figure 3:
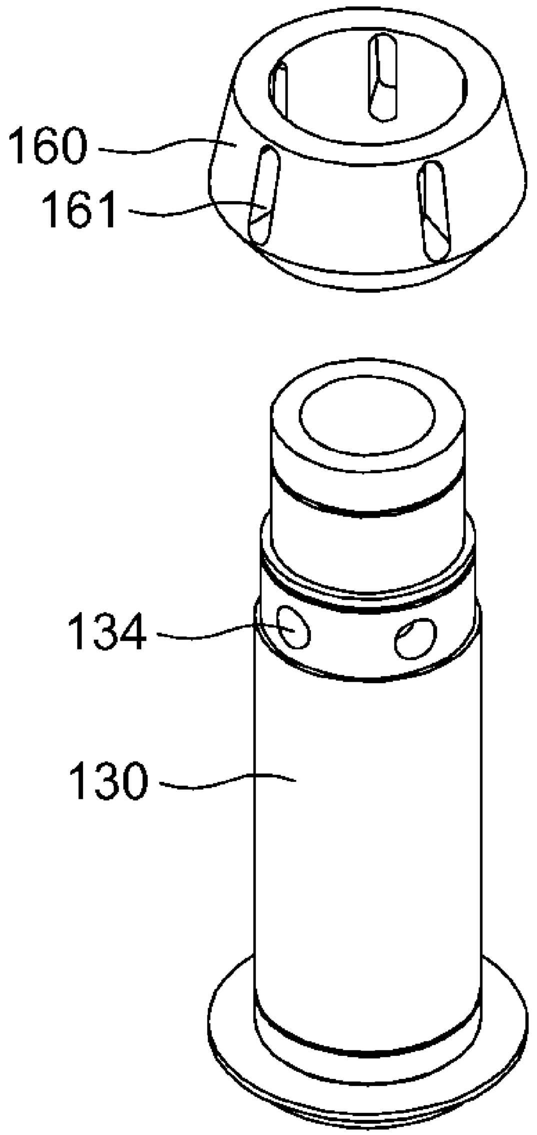
FIG. 3 is a perspective view illustrating an example of a dispersing means according to the present invention.
Figure 4:
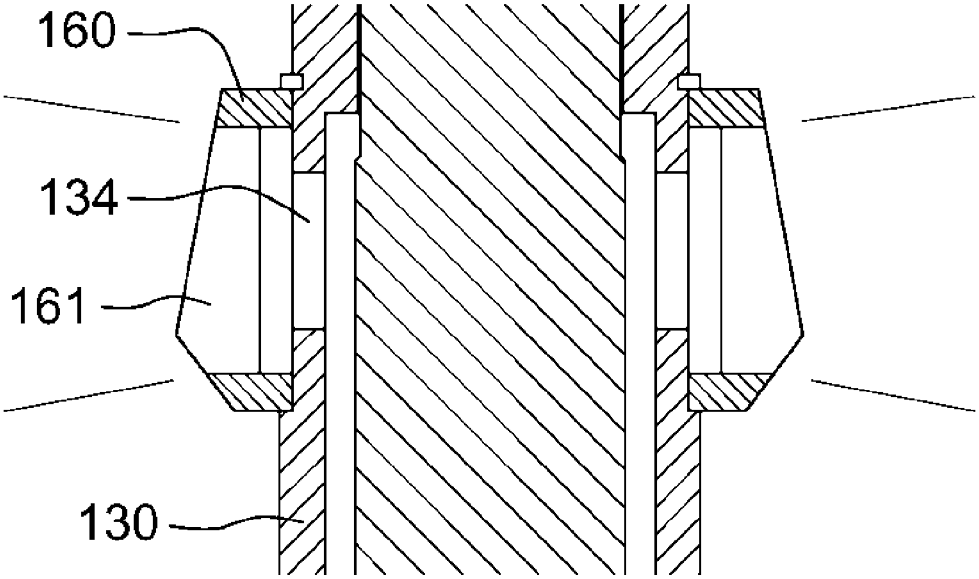
FIG. 4 is a sectional view showing the coupling of a nozzle cap to a spindle tube shown in FIG. 3.
Figure 5:
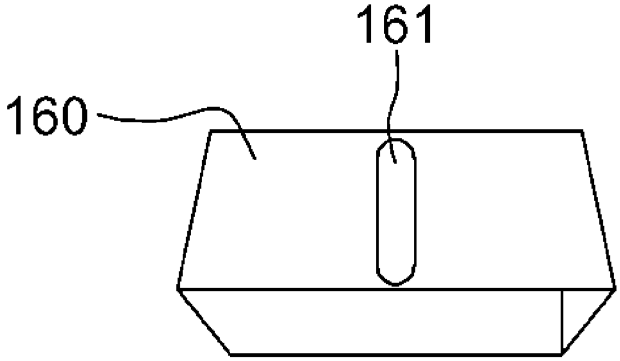
FIG. 5 is a front view showing the shape of a discharge hole that is vertically elongated.
Figure 6:
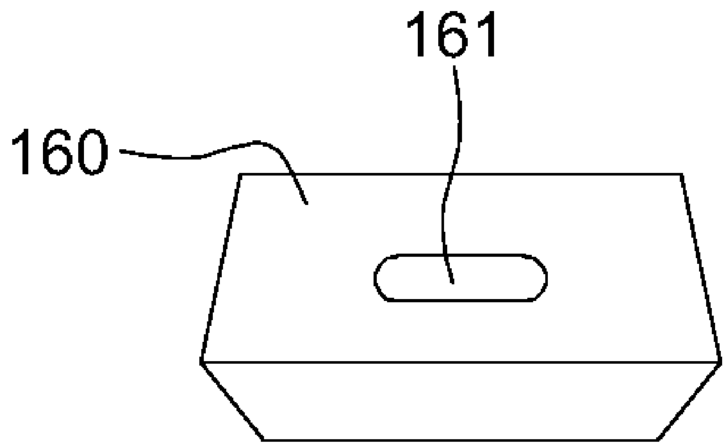
FIG. 6 is a front view showing the shape of a discharge hole that is horizontally elongated.
Figure 7:
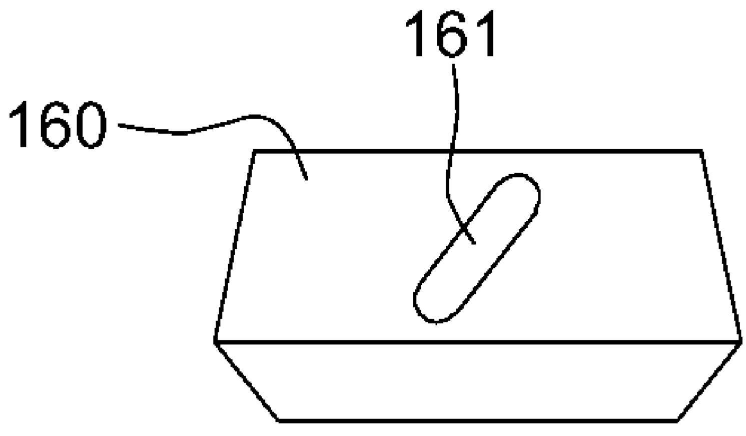
FIG. 7 is a front view showing the shape of a discharge hole that is diagonally elongated.

FIG. 3 is a perspective view illustrating an example of the dispersing means according to the present invention. FIG. 4 is a sectional view showing the coupling of a nozzle cap to the spindle tube shown in FIG. 3. FIG. 5 is a front view showing the shape of a discharge hole that is vertically elongated. FIG. 6 is a front view showing the shape of a discharge hole that is horizontally elongated. FIG. 7 is a front view showing the shape of a discharge hole that is diagonally elongated.

The dispersing means may comprise a nozzle cap 160 which is provided on the spindle tube 130 and discharges fluid from the spindle tube 130 into the rotor housing 120. A plurality of elongated discharge holes 161 are formed in the circumferential surface of the nozzle cap 160 so that fluid discharged from the nozzle cap 160 can form an elongated cross-sectional discharge shape and thus be widely dispersed into the rotor housing 120. Here, a plurality of flow holes 134 are formed in the spindle tube 130, so fluid is supplied from the shaft 110 to the nozzle cap 160 through the flow holes 134. The nozzle cap 160 covers the flow holes 134. Thus, fluid that is discharged from the flow holes 134 is moved in the circumferential direction along space between the spindle tube 130 and the nozzle cap 160 and then discharged out of the nozzle cap 160 through the elongated discharge holes 161 of the nozzle cap 160.

The nozzle cap 160 may be integrated with the spindle tube 130, but in this case it is very difficult to form the discharge holes 161 or the flow holes 134. Therefore, it is preferable that the nozzle cap 160 and the spindle tube 130 be separately manufactured and then coupled to each other. For this, the structure of the nozzle cap 160 is annular to allow the spindle tube 130 to be inserted into a central opening of the nozzle cap 160. The nozzle cap 160 may be forcibly fitted over the spindle tube 130 such that the nozzle cap 160 is integrally rotated along with the spindle tube 130. As necessary, the nozzle cap 160 may be welded to the spindle tube 130.

As shown in FIGS. 5 through 7, each discharge hole 161 formed in the nozzle cap 160 is elongated in one direction selected from among the vertical, horizontal and diagonal directions. Given that the shaft 110 around which the nozzle cap 160 rotates is oriented in the vertical direction, it is preferable for the discharge hole 161 to be elongated in the vertical direction so that fluid can be more effectively dispersed.

Figure 8:
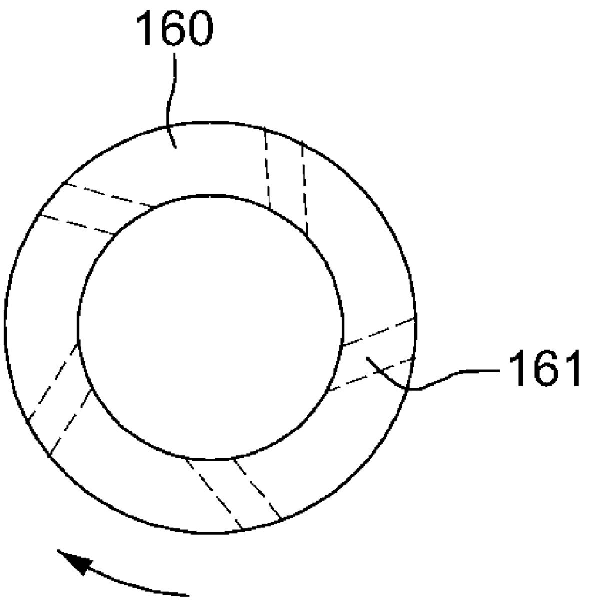
FIG. 8 is a plan view of the nozzle cap having elongated discharge holes that are slanted in a direction opposite to a direction in which the nozzle cap rotates.

FIG. 8 is a plan view of the nozzle cap having the elongated discharge holes that are slanted in a direction opposite to a direction in which the nozzle cap rotates. To effectively disperse fluid, each elongated discharge hole 161 formed in the nozzle cap 160 is slanted in the direction opposite to the direction in which the nozzle cap 160 rotates.

Figure 9:
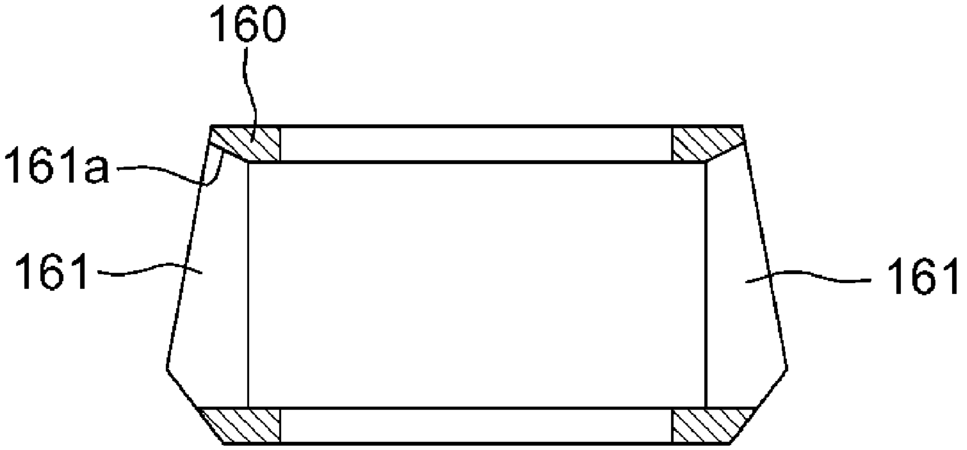
FIG. 9 is a sectional view of the nozzle cap, showing the sectional shapes of the elongated discharge holes.

FIG. 9 is a sectional view of the nozzle cap, showing the sectional shapes of the elongated discharge holes.

Preferably, an upper end 161*a* of each elongated discharge hole 161 formed in the nozzle cap 160 is inclined upwards in the outward direction. The purpose for this design is to make it possible for fluid discharged from the nozzle cap 160 to be dispersed even to a side above the nozzle cap 160 so that the fluid can be applied to a portion of the filter paper 1221 that is disposed above the nozzle cap 160.

In detail, as shown in FIG. 2, the nozzle cap 160 is located in the rotor housing 120 at a position approximately just above the central portion of the rotor housing 120. If the upper end of the discharge hole 161 is oriented in the horizontal direction, fluid discharged from the nozzle cap 160 cannot be applied to the portion of the filter paper 1221 that is disposed above the nozzle cap 160, thus reducing the area with which the filter paper 1221 can be used.

To prevent this, as shown in FIG. 9, in the present invention, each discharge hole 161 is configured such that the upper end 161*a* thereof is inclined upwards so that fluid discharged out of the discharge hole 161 can be oriented upwards. Thereby, the area of the filter paper 1221 that can be used is increased, thus extending the lifetime of the filter paper 1221 and increasing the efficiency of removing impurities from the fluid.

Figure 10:
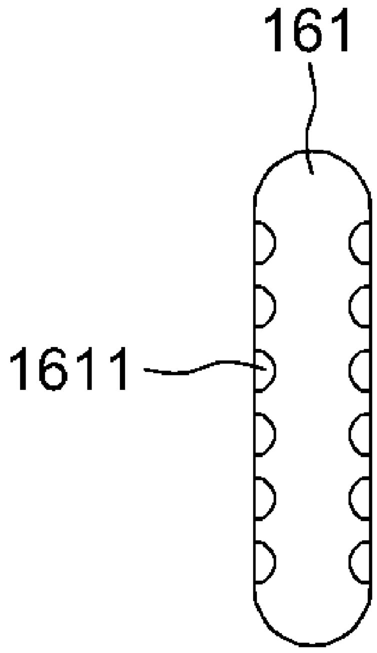
FIG. 10 is a side view showing protrusions provided on the inner surface of the elongated discharge hole.

FIG. 10 is a side view showing protrusions provided on the inner surface of the elongated discharge hole. If the protrusions 1611 are provided on the inner surface of the discharge hole 161, fluid that is being discharged through the discharge hole 161 can be scattered by interference of the protrusions 1611. Eventually, the effect of dispersion of fluid can be further enhanced.

Figure 11:
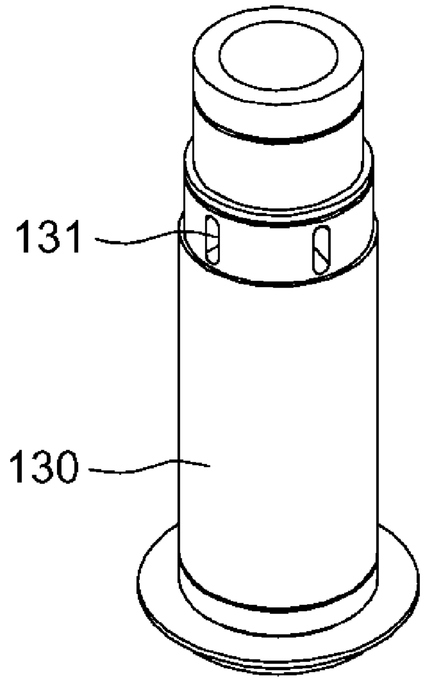
FIG. 11 is a perspective view illustrating another example of the dispersing means according to the present invention.
Figure 12:
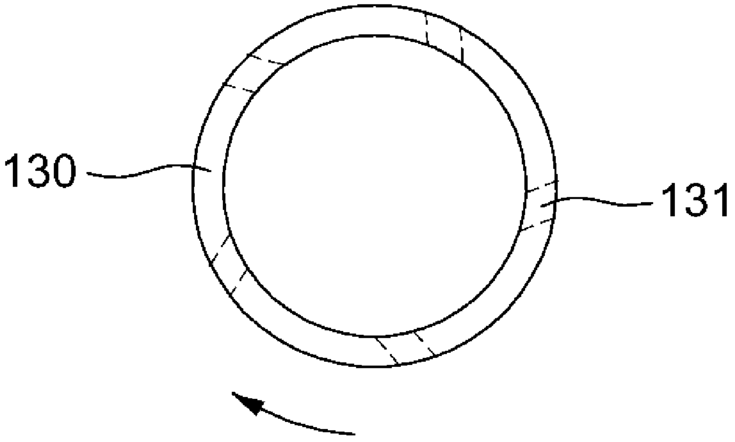
FIG. 12 is a plan view of a spindle tube having elongated discharge holes that are slanted in a direction opposite to a direction in which the spindle tube rotates.
Figure 13:
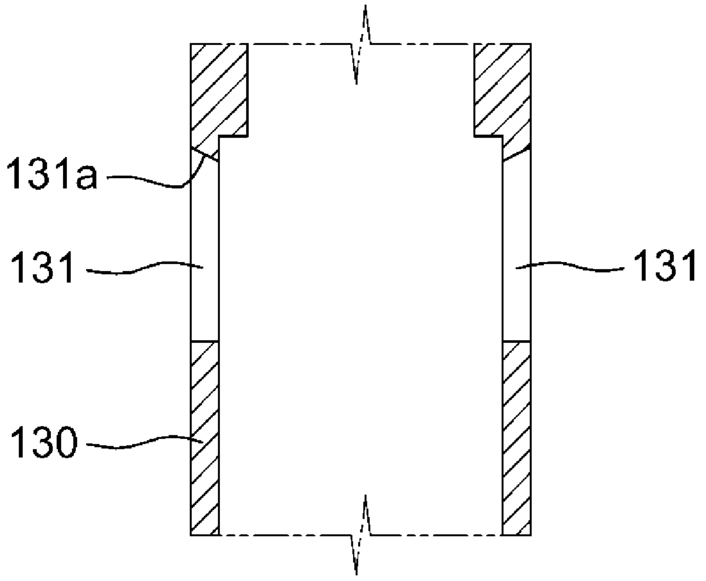
FIG. 13 is a sectional view of the spindle tube, showing the sectional shapes of the elongated discharge holes.
Figure 14:
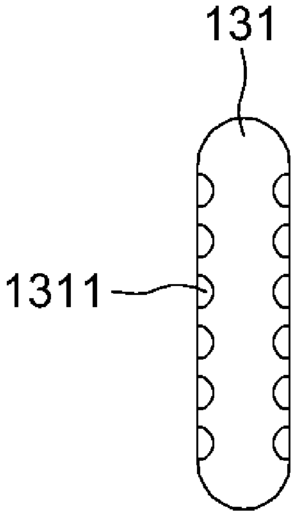
FIG. 14 is a side view showing protrusions provided on the inner surface of the elongated discharge hole.

FIG. 11 is a perspective view illustrating another example of the dispersing means according to the present invention. FIG. 12 is a plan view of a spindle tube having elongated discharge holes that are slanted in a direction opposite to a direction in which the spindle tube rotates. FIG. 13 is a sectional view of the spindle tube, showing the sectional shapes of the elongated discharge holes. FIG. 14 is a side view showing protrusions provided on the inner surface of the elongated discharge hole.

Unlike the former example of the dispersing means in which the nozzle cap 160 having the elongated discharge holes 161 is provided on the spindle tube 130, the dispersing means may be configured in such a simple way that elongated discharge holes 131 are directly formed in the spindle tube 130. In detail, the elongated discharge holes 131 are formed in the circumferential surface of the spindle tube 130 at positions spaced apart from each other at regular intervals. Each discharge hole 131 is elongated in one direction selected from among the vertical, horizontal and diagonal directions, in the same manner as the discharge hole 161 described above. Further, to effectively disperse fluid discharged from the elongated discharge holes 131, each elongated discharge hole 131 formed in the spindle tube 130 is slanted in the direction opposite to the direction in which the spindle tube 130 rotates.

In addition, an upper end 131*a* of each elongated discharge hole 131 is inclined upwards in the outward direction so that fluid discharged from the elongated discharge hole 131 can also be dispersed to the upper side. A plurality of protrusions 1311 are also provided on the inner surface of each elongated discharge hole 131, thus further enhancing the effect of dispersion of the fluid.

Figure 15:
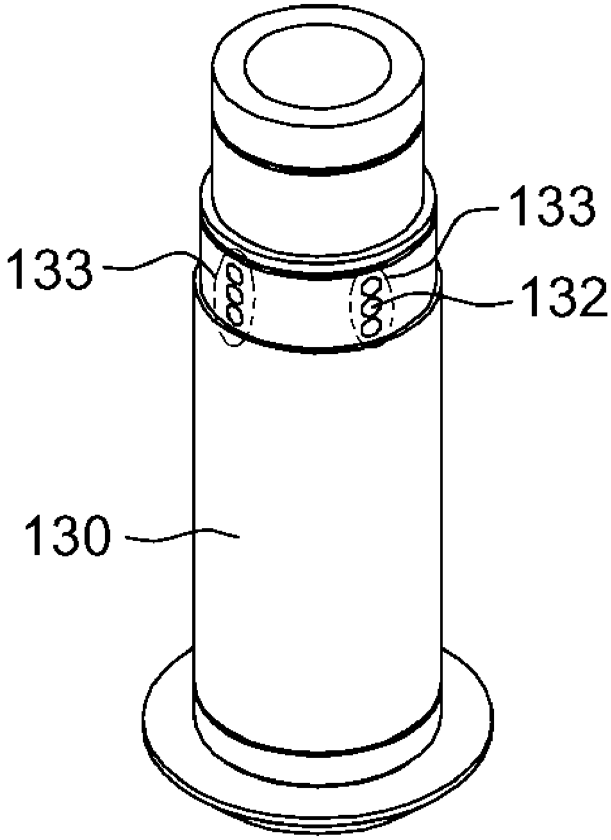
FIG. 15 is a perspective view illustrating a further example of the dispersing means according to the present invention.
Figure 16:
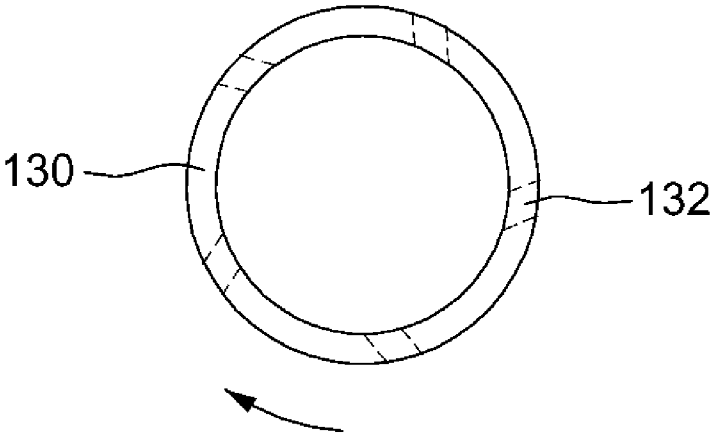
FIG. 16 is a plan view of a spindle tube having discharge holes that are slanted in a direction opposite to a direction in which the spindle tube rotates.

FIG. 15 is a perspective view illustrating a further example of the dispersing means according to the present invention. FIG. 16 is a plan view of a spindle tube having discharge holes that are slanted in a direction opposite to a direction in which the spindle tube rotates. In this example, the dispersing means comprises a plurality of discharge hole groups 133 which are formed in the circumferential surface of the spindle tube 130 at positions spaced apart from each other at regular intervals. Each discharge hole group 133 includes a plurality of discharge holes 132 which are arranged adjacent to each other in a line so that fluid can be discharged in an elongated cross-sectional shape. When forming each discharge hole group 133 using the discharge holes 132 to form the dispersion means, the discharge holes 132 are arranged in one direction selected from among the vertical, horizontal and diagonal directions. Here, as stated above, because the spindle tube 130 rotates around the shaft 110 that is vertically oriented, it is preferable for the discharge holes 132 to be arranged in the vertical direction so that fluid can be effectively dispersed.

Further, the discharge holes 132 are slanted in the direction opposite to the direction in which the spindle tube 130 rotates, so that fluid discharged from the discharge holes 132 can be more effectively dispersed.

Figure 17:
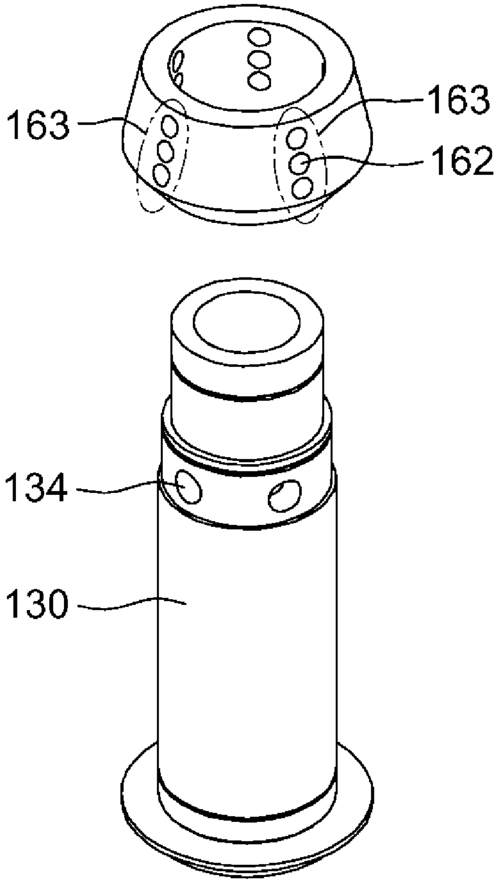
FIG. 17 is a perspective view illustrating yet another example of the dispersing means according to the present invention.
Figure 18:
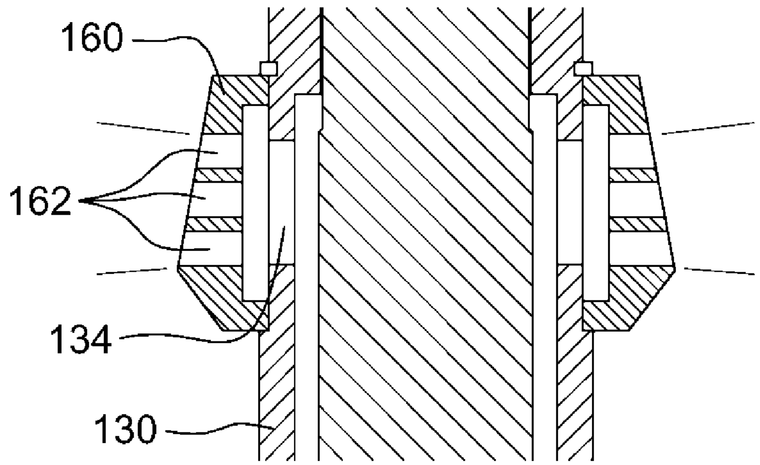
FIG. 18 is a sectional view showing the coupling of a nozzle cap to a spindle tube shown in FIG. 17.
Figure 19:
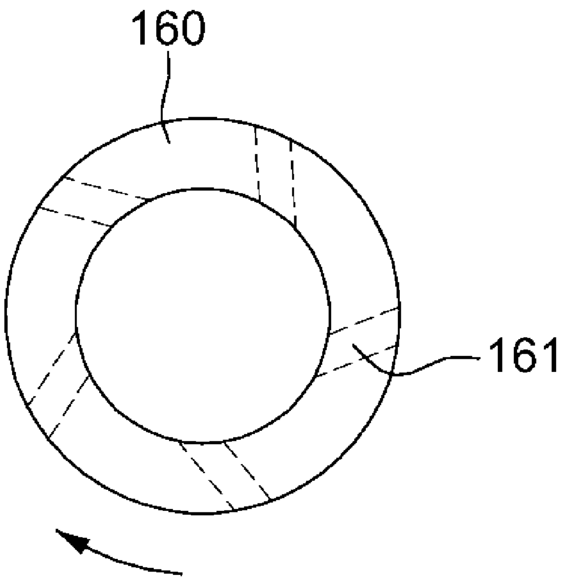
FIG. 19 is a plan view of the nozzle cap having discharge holes that are slanted in a direction opposite to a direction in which the nozzle cap rotates.

FIG. 17 is a perspective view illustrating yet another example of the dispersing means according to the present invention. FIG. 18 is a sectional view showing the coupling of a nozzle cap to a spindle tube shown in FIG. 17. FIG. 19 is a plan view of the nozzle cap having discharge holes that are slanted in a direction opposite to a direction in which the nozzle cap rotates.

In this example, the dispersing means is configured such that the nozzle cap 160 is provided on the spindle tube 130, wherein the nozzle cap 160 has a plurality of discharge hole groups 163 in the circumferential surface thereof, and each discharge hole group 163 comprises a plurality of discharge holes 162 which are arranged adjacent to each other in a line so that fluid can be discharged in an elongated cross-sectional shape. Here, a plurality of flow holes 134 are formed in the spindle tube 130, so fluid is supplied from the shaft 110 to the nozzle cap 160 through the flow holes 134. The nozzle cap 160 covers the flow holes 134. Thus, fluid that is discharged from the flow holes 134 is moved in the circumferential direction along a space between the spindle tube 130 and the nozzle cap 160 and then discharged out of the nozzle cap 160 through the discharge holes 162 of the nozzle cap 160.

The nozzle cap 160 may be forcibly fitted over or welded to the spindle tube 130 so that the nozzle cap 160 can be integrally rotated along with the spindle tube 130. Furthermore, when forming each discharge hole group 163 using the discharge holes 162 to form the dispersion means, the discharge holes 162 are arranged in one direction selected from among the vertical, horizontal and diagonal directions. Here, as stated above, because the spindle tube 130 rotates around the shaft 110 that is vertically oriented, it is preferable for the discharge holes 162 to be arranged in the vertical direction so that fluid can be effectively dispersed.

Moreover, the discharge holes 162 are slanted in the direction opposite to the direction in which the spindle tube 130 rotates, so that fluid discharged from the discharge holes 162 can be more effectively dispersed.

Figure 20:
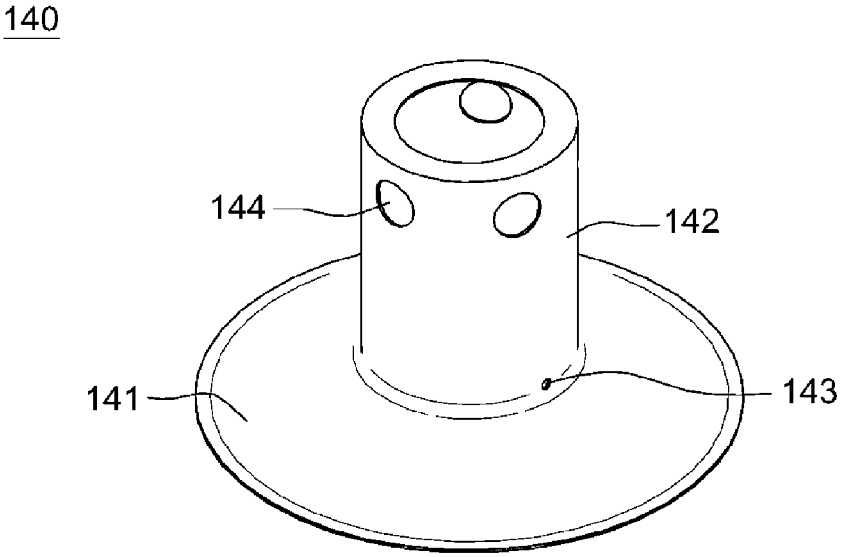
FIG. 20 is a perspective view showing the structure of an example of a separation film according to the present invention.

FIG. 20 is a perspective view showing the structure of an example of the separation film according to the present invention. The separation film 140 according to the present invention has a drain hole 143. The drain hole 143 functions to drain fluid that has remained in the upper portion S1 of the internal space after the centrifugal filter has stopped, thus preventing the fluid that has remained from being contaminated, and reducing the amount of fluid that is remained in the centrifugal filter when work of maintaining or repairing the centrifugal filter is carried out, thereby facilitating the work.

The separation film 140 includes a ramp part 141 which separates the internal space of the rotor housing 120 into the upper and lower portions and is inclined to promote deposition of impurities, and an extension part 142 which extends from the ramp part 141 uprightly and separates the internal space of the rotor housing 120 into the inner and outer portions. The drain hole 143 is disposed in the junction between the part 141 and the vertical extension part 142, so fluid that has remained in the upper portion S1 of the internal space is discharged into the lower portion S2 through the drain hole 143.

In the drawing, reference numeral 144 denotes an inlet hole into which fluid from which impurities have been removed is drawn. Fluid that has been drawn into the inlet hole flows into the lower portion S2 of the internal space of the rotor housing 120.

Figure 21:
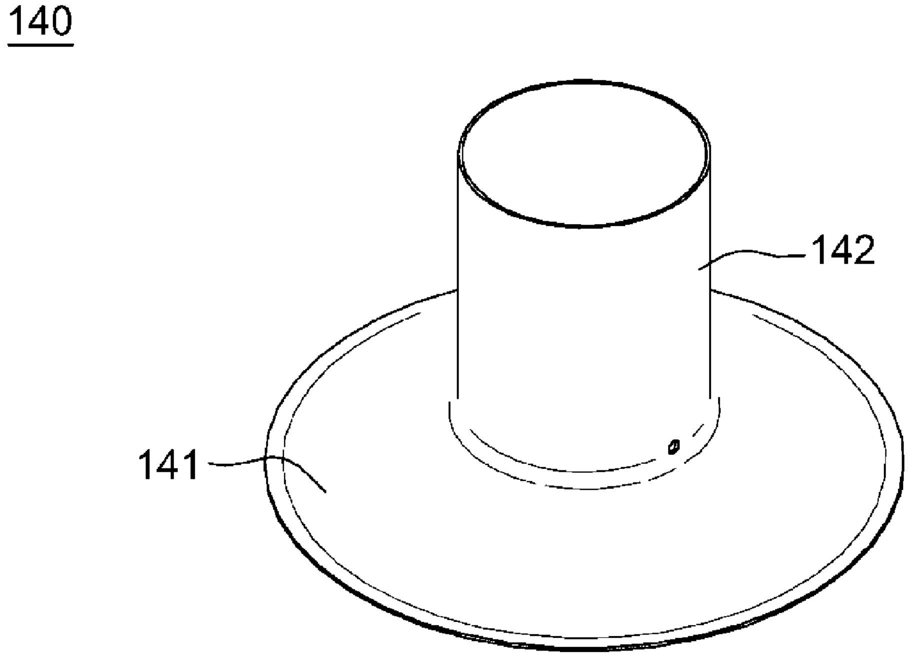
FIG. 21 is a perspective view showing the structure of another example of the separation film according to the present invention.

FIG. 21 is a perspective view showing the structure of another example of the separation film according to the present invention. When forming the separation film 140 including the ramp part 141 and the vertical extension part 142 as stated above, the vertical extension part 142 may be configured such that the upper end thereof is completely open rather than having the inlet hole 144. In this case, filtered fluid overflows the upper end of the extension part 142 and enters the lower portion S2 of the internal space of the rotor housing 120.

A process of filtering out impurities in the centrifugal filter including the dispersion means of FIG. 3 will now be explained. Fluid that is drawn into the spindle tube 130 through the shaft 110 enters the nozzle cap 160 through the flow holes 134 formed in the spindle tube 130. Fluid that has entered the nozzle cap 160 is discharged into the rotor housing 120 through the elongated discharge holes 161 formed in the nozzle cap 160.

Here, because the shape of each discharge hole 161 is a vertically elongated shape, fluid that is discharged from the discharge hole 161 forms a vertically-elongated cross-sectional shape. Rotational inertia and centrifugal force are added to the fluid that forms the above-mentioned discharge shape, so that the fluid can be dispersed to a wide area. Fluid that has been dispersed as described above is uniformly applied to the filter paper 1221 which is provided on the inner surface of the sidewall of the rotor housing 120. Therefore, the efficiency of removing impurities from the fluid can be enhanced. Compared to the conventional technique, the area of the filter paper 1221 that can be used is increased, thus extending the lifetime of the filter paper 1221.

Table 1 illustrates the results of measurement of the temperatures, RPMs, pressures and flow rates according to time while the conventional centrifugal filter having the structure of FIG. 1 and the centrifugal filter of the present invention having the dispersing means illustrated in FIG. 3 are operated for a predetermined amount of time. Further, Table 1 shows the results of measurement of the weights of filtered-out impurities obtained from the filter papers, eventually comparing the efficiencies of filtering out impurities from fluid.

TABLE 1

| | Conventional centrifugal filter | | | | | Centrifugal filter of present invention | | | | |
|---|---|---|---|---|---|---|---|---|---|---|
| Time | 09:40 | 11:40 | 13:40 | 15:40 | 17:40 | 09:40 | 11:40 | 13:40 | 15:40 | 17:40 |
| Temp. (° C.) | 75 | 75 | 75 | 75 | 75 | 75 | 75 | 75 | 75 | 75 |
| RPM | 3643 | 3868 | 3866 | 3861 | 3875 | 4130 | 4448 | 4447 | 4437 | 4434 |

TABLE 1-continued

| | Conventional centrifugal filter | | | | | Centrifugal filter of present invention | | | | |
|---|---|---|---|---|---|---|---|---|---|---|
| Time | 09:40 | 11:40 | 13:40 | 15:40 | 17:40 | 09:40 | 11:40 | 13:40 | 15:40 | 17:40 |
| Pressure (bar) | 4.5 | 4.5 | 4.5 | 4.5 | 4.5 | 4.5 | 4.5 | 4.5 | 4.5 | 4.5 |
| Flow rate (L/min) | 14 | 14 | 14 | 14 | 14 | 16 | 16 | 16 | 16 | 16 |
| Total weight (g) | | | 611.77 | | | | | 824.90 | | |
| Paper weight (g) | | | 13.80 | | | | | 14.35 | | |
| Impurity weight (g) | | | 597.97 | | | | | 810.55 | | |

As illustrated in Table 1, the weight of impurities filtered out by the conventional centrifugal filter is 597.97 g, and the weight of impurities filtered out by the centrifugal filter of the present invention is 810.55 g, so it can be appreciated that the present invention can enhance the performance by about 35.55%.

The present invention is not limited to the above-described specific embodiments, and those skilled in the art will appreciate that various modifications, additions and substitutions are possible, without departing from the scope and spirit of the invention as disclosed in the accompanying claims.

The invention claimed is:

1. A centrifugal filter, comprising: a shaft (110) defining a passage therein through which fluid enters the centrifugal filter; a rotor housing (120) rotating around the shaft (110) and generating centrifugal force, with a filter paper (1221) provided on an inner surface of a sidewall of the rotor housing (120); a spindle tube (130) rotating along with the rotor housing (120) around the shaft (110), the spindle tube (130) receiving fluid from the shaft (110) and discharging the fluid into the rotor housing (120); and a separation film (140) separating an internal space of the rotor housing (120) into upper and lower portions and into inner and outer portions so that impurities that are removed from the fluid by means of centrifugal force are deposited in the upper portion (S1) of the internal space while filtered fluid flows into the lower portion (S2) of the internal space and is then discharged through a nozzle (150) provided in a lower end of the rotor housing (120), wherein dispersing means is provided on the spindle tube (130) to make a cross-sectional shape of the fluid discharged from the spindle tube (130) into the rotor housing (120) be an elongated shape so that the fluid is widely dispersed into the rotor housing (120).

2. The centrifugal filter according to claim 1, wherein the dispersing means comprises a nozzle cap (160) provided on the spindle tube (130), the nozzle cap (160) discharging fluid from the spindle tube (130) into the rotor housing (120), wherein a plurality of discharge holes (161) are formed in a circumferential surface of the nozzle cap (160) and each of the discharge holes (161) has an elongated shape so that the fluid discharged into the rotor housing (120) is widely dispersed.

3. The centrifugal filter according to claim 2, wherein each of the discharge holes (161) is slanted in a direction opposite to a direction in which the nozzle cap (160) rotates.

4. The centrifugal filter according to claim 3, wherein each of the discharge holes (161) has a vertically-elongated shape.

5. The centrifugal filter according to claim 3, wherein a plurality of protrusions (1611) are provided on an inner surface of each of the discharge holes (161) so as to scatter fluid.

6. The centrifugal filter according to claim 2, wherein an upper end (161*a*) of each of the discharge holes (161) is inclined upwards.

7. The centrifugal filter according to claim 6, wherein each of the discharge holes (161) has a vertically-elongated shape.

8. The centrifugal filter according to claim 6, wherein a plurality of protrusions (1611) are provided on an inner surface of each of the discharge holes (161) so as to scatter fluid.

9. The centrifugal filter according to claim 2, wherein each of the discharge holes (161) is slanted in a direction opposite to a direction in which the nozzle cap (160) rotates, and an upper end (161*a*) of each of the discharge holes (161) is inclined upwards.

10. The centrifugal filter according to claim 9, wherein each of the discharge holes (161) has a vertically-elongated shape.

11. The centrifugal filter according to claim 9, wherein a plurality of protrusions (1611) are provided on an inner surface of each of the discharge holes (161) so as to scatter fluid.

12. The centrifugal filter according to claim 1, wherein the dispersing means comprises a plurality of discharge holes (131) formed in a circumferential surface of the spindle tube (130), each of the discharge holes (131) having an elongated shape so that the fluid discharged from the spindle tube (130) is dispersed.

13. The centrifugal filter according to claim 12, wherein each of the discharge holes (131) is slanted in a direction opposite to a direction in which the spindle tube (130) rotates.

14. The centrifugal filter according to claim 13, wherein each of the discharge holes (131) has a vertically-elongated shape.

15. The centrifugal filter according to claim 13, wherein a plurality of protrusions (1311) are provided on an inner surface of each of the discharge holes (131) so as to scatter fluid.

16. The centrifugal filter according to claim 12, wherein an upper end (131*a*) of each of the discharge holes (131) is inclined upwards.

17. The centrifugal filter according to claim 16, wherein each of the discharge holes (131) has a vertically-elongated shape.

18. The centrifugal filter according to claim 16, wherein each of the discharge holes (131) has a vertically-elongated shape.

19. The centrifugal filter according to claim 12, wherein each of the discharge holes (131) is slanted in a direction opposite to a direction in which the spindle tube (130) rotates, and an upper end of each of the discharge holes (131) is inclined upwards.

20. The centrifugal filter according to claim 19, wherein a plurality of protrusions (1311) are provided on an inner surface of each of the discharge holes (131) so as to scatter fluid.

21. The centrifugal filter according to claim 19, wherein a plurality of protrusions (1311) are provided on an inner surface of each of the discharge holes (131) so as to scatter fluid.

22. The centrifugal filter according to claim 1, wherein the dispersing means comprises a plurality of discharge hole groups (133) formed in a circumferential surface of the spindle tube (130), each of the discharge hole groups (133)

comprising a plurality of discharge holes (132) arranged adjacent to each other in one direction selected from among vertical, horizontal and diagonal directions so that fluid is discharged from the discharge holes (132) in an elongated cross-sectional shape.

23. The centrifugal filter according to claim 22, wherein each of the discharge holes (132) is slanted in a direction opposite to a direction in which the spindle tube (130) rotates.

24. The centrifugal filter according to claim 1, wherein the dispersing means comprises a nozzle cap (160) provided on the spindle tube (130), the nozzle cap (160) discharging fluid from the spindle tube (130) into the rotor housing (120), wherein a plurality of discharge hole groups (163) are formed in a circumferential surface of the nozzle cap (160), each of the discharge hole groups (163) comprising a plurality of discharge holes (162) arranged adjacent to each other in one direction selected from among vertical, horizontal and diagonal directions so that the fluid is discharged from the discharge holes (162) in an elongated cross-sectional shape.

25. The centrifugal filter according to claim 24, wherein each of the discharge holes (162) is slanted in a direction opposite to a direction in which the spindle tube (130) rotates.

26. The centrifugal filter according to claim 1, wherein a drain hole (143) is formed in the separation film (140) so that when the centrifugal filter stops, fluid that has remained in the upper portion (S1) of the internal space is discharged into the lower portion (S2) of the internal space through the drain hole (143).

* * * * *